United States Patent Office 3,442,975
Patented May 6, 1969

3,442,975
POLYIMINE/POLYCARBONAMIDE GRAFT POLYMERS
Thomas M. Cawthon, Dover, George J. Schmitt, Madison, Allen F. Higbee, Cedar Knolls, Jack R. Pedersen, Parsippany, and Hendrikus J. Oswald, Morristown, N.J., assignors to Allied Chemical Corporation, New York, N.Y., a corporation of New York
No Drawing. Filed Jan. 11, 1967, Ser. No. 608,516
Int. Cl. C08g 20/10
U.S. Cl. 260—857                    10 Claims

ABSTRACT OF THE DISCLOSURE

This invention relates to graft polymers, i.e., polymers having a long polymeric chain, designated the backbone; and having shorter polymeric chains each pendant from the backbone at successive points along the length of the backbone, designated side chains. More particularly this invention relates to graft polymers wherein the side chains are polycarbonamide chains having as repeating unit the diradical of a monoamino monocarboxylic acid, i.e., —NHRC(=O)—, wherein R has chain lengths between 3 and 18 atoms, especially being 5 to 11 methylene groups, including such graft polymers in the form of a drawn, molecularly oriented filament from polyethylenimine/ε-caprolactam; and process of producing said graft polymers by polymerizing lactam in admixture with polyimine using amino carboxylic acid catalyst or promoter.

Field of the invention and description of the prior art

It has been proposed to form polycarbonamide graft polymers upon a long chain polymer as a backbone. Long chain backbone polymers previously proposed have reactive groups pendant from the backbone, e.g., carboxylic or amino groups. Examples are polyacrylic acid as in U.S. Patent 2,524,045 of Oct. 3, 1950 to Flory; and polyvinylamine suggested in col. 3, line 62 of U.S. Patent 2,615,863 of Oct. 28, 1952 to Flory. When the reactive groups are spaced along the backbone with average separation of not more than 5 chain atoms, difficulties have been experienced in attempting to utilize such graft polymers for, e.g., molding or extrusion, apparently due to tendency of these polymers to become crosslinked as indicated by troublesome gel formation. Although controllable crosslinking is desirable to impart solvent resistance to a finished product, spontaneous crosslinking is undesirable since it creates difficulties in molding, extruding, and generally in fabricating of the polymer, and creates gels causing imperfections in the finished product.

Summary of the invention

In accordance with this invention, a graft polymer of polycarbonamide is provided which has exceptionally high fluidity in the melt for given viscosity in dilute solution, and/or has an exceptionally large number of end groups, such as primary amino, for given fluidity, compared to polycarbonamide homopolymers having comparable physical properties in the standard tensile tests. The graft polymer of this invention has as the backbone a polyimine wherein the imino nitrogen atoms are separated on the average by no more than 5 chain atoms, and has side chains in which the repeating unit is the diradical of a monoamino monocarboxylic acid with a chain of 3 to 18 atoms between the amino and the carboxyl groups, said side chains having a number average molecular weight of at least 500 but not greater than about ½ the average molecular weight of the backbone chain.

The subject graft polymers are best prepared by polymerizing a lactam under the influence of an acidic catalyst in admixture with a polyimine, which polyimine should have an average of at least 10 hydrogen-bearing nitrogen atoms in each polymer chain, these providing sites for attachment of the growing polylactam chains. A preferred group of polyimines are of relatively high molecular weight, imparting fiber-forming properties to the graft polymer. The polymerization conditions used can be conventional conditions for acid catalyzed lactam polymerization, using a temperature in the range of 180° C.–300° C. and using some water in the starting reaction mixture. (See, e.g., U.S. Patent 2,241,321 of May 6, 1941 to Schlack.) It will be appreciated that a lactam such as ε-caprolactam can be converted by heating with water into monoamino monocarboxylic acid and/or low molecular weight polymers thereof; so that water is at least a partial equivalent of an acid such as epsilon-aminocaproic acid in the subject process. Nevertheless for reasons not fully understood, the use of small amounts of primary monoamino monocarboxylic acids wherein the primary amino group is attached to a nonaromatic carbon atom appears to give distinctly faster polymerization than use of water alone as catalyst. The proportions of polyimine should provide about 0.1–25 mols of hydrogen-bearing nitrogen atoms per 100 mols of lactam in the initial reaction mixture.

The resulting polymers of the invention have generally the properties of polyamides, consistently with their high polyamide content, but generally have much greater fluidity in the melt, as measured, e.g., by melt index, compared to homopolymers of the same lactam having comparable tensile properties. Accordingly the subject polymers can be more quickly and more accurately molded, especially in intricate injecting molds, than can be the comparable homopolymers. Further contributing to moldability is the observed high rate at which these graft polymers crystallize.

Moreover as directly produced, the subject polymers have both unreacted imino groups in the backbone and primary amino groups at the free ends of the side chains. These primary amino groups typically analyze at least 90 milliequivalents per kilogram of polymer. As is known, primary amino groups attached to non-aromatic carbon atoms enhance the dyeability of polycaproamides (see, e.g., U.S. Patent 2,636,873 of Apr. 28, 1953 to Graham); as do also imino groups. Such enhancement is not generally obtained, however, without sacrifice in spinnability and/or drawability of the polymer, and/or uniformity of dyeing. Polymers of the higher melt viscosities (lower melt indices of 35 gm./10 min. down to 1 gm./10 min. by the test below specified), obtained in accordance with this invention are distinguished by good spinnability and drawability as well as good dyeability. These polymers are accordingly of special value in the form of a drawn, molecularly oriented filament. These same polymers and also those in accordance with this invention which are below fiber-forming molecular weight, can be blended with fiber-forming polycarbon-amides and/or with fiber-forming polymers generally, enhancing the dyeability of the filaments obtained from the blends.

Detailed description of preferred embodiments

Preferred products in accordance with this invention are obtained by use of polyethylenimine of molecular weight at least about 20,000 (as estimated by standard methods). Useful proportions of the polyethylenimine are from about 0.1 mol to about 25 mols per 100 mols of the lactam which is polymerized in presence of such imine. It will be appreciated that, particularly at the higher concentrations of imine, only a fraction of the hydrogen-bearing nitrogen atoms in the imine will react with growing polylactam chains, so that the resulting polymer will contain some unreacted imino nitrogen atoms together with imino nitrogen atoms bearing pendant polycarbonamide chains. These polycarbonamide chains will be of varying molecular weights but the reactivity of the imino groups is found sufficient, and the molecular weight of the polyimine is chosen, so that the average molecular weight of the polycarbonamide chains will not exceed about ½ the average molecular weight of the polyimine backbone. Molecular weights of the polycarbonamide side chains are number average molecular weights as determined for example by analysis for concentration of primary amino groups per kilogram of polymer. The molecular weight of the polyimine backbone is taken as being that of the starting polyimine; and this is consistent with the observed increase in dilute solution viscosity at given average length of side chains and increasing polyimine starting molecular weights.

An alternative manner of expressing the minimum chain length of the polyimine backbone and relation of chain length of backbone compared to side chains of the polymers of the invention is in terms of reduced viscosity of the graft polymer in dilute solution, indicative of the over-all molecular weight, and melt index of the polymer determined by extrusion of the melt through a standard orifice in the usual manner (ASTM D1238–62T), suitably at a temperature of 235° C. and load of 325 grams. In these terms, the reduced viscosity of the products in meta-cresol at concentration of 0.5 gram of polymer per 100 ml. of solvent and 25° C. is at least 0.1 dl./gm.; and the melt index is at least 0.5 gram per 10 minutes. Polymers which are preferred because of their having proper melt strength and fluidity for extrusion as filaments, and still having a large number of end groups, have reduced viscosity of at least 0.85 dl./gm. and melt index of at least 1 gram per 10 minutes. These polymers show by analysis for primary amino end groups a value of at least 90 meq./kg. (milliequivalents per kilogram). They are obtained from a polyimine polymer having a molecular weight of at least 20,000.

The reason for the high fluidity (as shown by high melt index) found in certain of our polymers is believed to be that the side chains are relatively mobile because of the relative shortness of these side chains compared to the polymer backbone. However the side chains must have a certain length to attain adequate flexibility, so that a number average molecular weight in the side chains of at least 500 is desirable, preferably about 2,000–20,000.

Polyethylenimine is the preferred backbone polymer because of its availability and its high content of imino groups. However, substituted polyethylenimines such as poly-2-methylaziridine and poly-2,2-dimethylaziridine can be used. On the average at least 10 of the imino nitrogen atoms in the polyimine molecules should bear a hydrogen atom, but the remaining imino nitrogen atoms of the molecule can be substituted, e.g., by a methyl, ethyl or propyl substituent whereby this nitrogen is strongly basic and contributes to dyeability; or by other substituent such as chlorine, or an acyl group; or can also bear a hydrogen atom. For purposes of producing filaments from the graft polymers of this invention, it is preferred to employ a polyimine polymer of high molecular weight, at least 20,000 and more particularly 50,000–500,000.

The preferred mode of grafting the polycarbonamide, found to give a minimum of gel formation together with adequate reaction rates, is to polymerize a lactam in admixture with the polyimine under nonalkaline conditions, using an acidic catalyst. Suitable lactams for use in this technique are those known to polymerize under the influence of acid catalysts, in particular the lactams containing only one carbonamide group (CONH) and additionally containing in the ring 5–11 methylene groups, particularly w-caprolactam, w-enantholactam, w-caprylolactam and w-laurolactam. These lactams can be used singly or in admixture. The resulting graft polymers have side chains wherein the repeating unit consists of an amido nitrogen and a carbonyl group separated by 5–11 methylene groups. Such polymers having amino end groups on the side chains can be modified by terminating the amino end groups, e.g., with compounds containing carboxyl or other groups reactive with primary amino. Controlled crosslinking can be obtained via these amino end groups by reaction with difunctional compounds such as diisocyanates.

A preferred group of catalysts or promoters which can be used to produce graft polymers in accordance with this invention are the primary monoamino, monocarboxylic acids wherein the primary amino group is attached to a nonaromatic carbon atom, such as e-aminocaproic acid, meta- and/or para-amino methylbenzoic acids, 3 and/or 4-aminomethyl cyclohexane carboxylic acid, etc. Monocarboxylic acids without amino groups can also be used, if dyeability is not important for the contemplated end use of the polymer; these can be expected to react with and substitute some of the imino nitrogen atoms. Another useful group of acidic catalysts is the group consisting of acids of phosphorus such as the orthophosphoric acid, pyrophosphoric acid, and hypophosphorous acid.

The average chain length of the polycarbonamide side chains formed from the polymerized lactam is apparently set by the proportion of hydrogen-bearing imino nitrogen atoms vs. lactam in the reaction mixture; the polycarbonamide chains being shorter on the average, the higher the proportion of hydrogen-bearing imino groups. The hydrogen-bearing imino groups should accordingly be provided in proportions in the initial reaction mixture between about 0.1 mol (for high polycarbonamide average chain length) to about 25 mols (for low polycarbonamide average chain length) per 100 mols of lactam in the initial reaction mixture. As previously noted, if a carboxylic acid having no primary amino group is present in the reaction mixture this will react with imino hydrogen and thus will affect the number of the side chains; and will also affect the length of the side chains by reacting with primary amino groups, whereas an amino carboxylic acid promotes the polymerization without exerting these other effects.

As an alternative to polymerizing a caprolactam in admixture with polyimine, it appears possible to preform the polycarbonamide at desired molecular weight, adjusted by adjusting the water content of the reaction mixture, and then graft the resulting polymer with the polyimine by heating them in admixture. In this procedure it is considered that a strong catalyst is desirable to promote a satisfactory extent of grafting, such as an acid of phosphorus. This procedure can be applied not only to polyethylenimine but also to the N-acyl substituted polyethylenimines obtained by polymerizing oxazolines. An imide interchange takes place whereby the acyl substituent in the polyoxazoline is eliminated and the polycarbonamide replaces it as substituent upon the nitrogen atom.

As above indicated, the polymers of the invention can be chemically modified by reaction of their primary amino groups. They can also be modified with additives such as pigments, delusterants, plasticizers, heat- and/or light- and/or oxygen-aging inhibitors, reinforcing fillers either inorganic or organic, crystallizing agents and in general, any of the numerous modifiers applicable with polycaproamides and/or with polyimines. Among such additives may be mentioned titanium dioxide; 2,9-dimethylquinacridone pigment (U.S. Patent 3,279,974 of Oct. 18, 1966 to Twilley and Matson); manganese compound/hypophosphorous acid light stabilizer (U.S. Patent 3,242,134 of Mar. 22, 1966 to Papero); copper compound/phosphorus compound/halogen compound heat stabilizers of U.S. Patent 2,705,227 of Mar. 29, 1955 to Stamatoff; flame retardants; glass fibers; carbon black; molybdenum disulfide; dispersed or dissolved organic polymers such as polyethylene, polytetrafluoroethylene, polyvinyl chloride, polyethylene terephthalate, polycarbonamide differing from the subject graft polymers; etc.

The examples which follow describe completely specific embodiments of this invention and set forth the best mode contemplated by the inventors for carrying out the invention, but are not to be interpreted as limiting the invention to the precise details of the examples.

Procedure

The reactions were carried out in a resin flask fitted with a reflux condenser; an inlet tube and outlet tube for maintaining a slow stream of purified nitrogen as atmosphere in the reaction vessel; a mechanical stirrer; and a thermocouple in a well dipping into the melt. The flask was heated in an oil bath in which the temperature could be automatically controlled.

The reaction was conducted by charging the vessel, heating under nitrogen and refluxing water from the reaction mixture for about 1-2 hours, then allowing the water to distill out by shutting off the cooling water flow to the condenser. The occurrence of polymerization could be inferred when the reaction mixture was observed to become viscous. Constant measured viscosity of samples indicated the polymerization to be complete. When aminocaproic acid catalyst was used, a reaction period of about 5 hours at a reaction temperature of about 260° C.–270° C. appeared sufficient to complete the polymerization; however the reaction was often continued much longer in the examples as will be noted.

The reaction vessel was cooled while continuing the slow flow of nitrogen therethrough, until the molten polymer crystallized as indicated by shrinkage. The polymer was cut up and then ground in a Wiley mill to pass 20 mesh. The granules were extracted at least twice using at least 2-fold their weight of water under reflux, each extraction being for 2 hours, whereby water extractables (monomer and low polymer) were removed. The polymer thus obtained was rinsed with methanol and thoroughly dried by heating in a vacuum oven at 80° C. for about 3 days.

Physical properties were determined upon the dry polymer thus obtained by molding bars and testing them. Monofils for testing were extruded through a die by use of a gas rheometer under pressure of 6 to 10 pounds at 220°–240° C.; or for more viscous polymers by use of a conventional ram extruder at 220°–245° C. These monofils showed good drawability to permanently elongated, molecularly oriented filament as indicated by the relatively high draw ratios of 5:1 and above that could be used, upon drawing over a heated plate.

Where polymers tested are stated to be "wet," the molded specimens were soaked in water for 5 days at 50° C. and tested after only surface drying.

In Table 1 which follows, the specific conditions for the several examples are shown, viz. the charge, the reaction temperature, and the time at temperature; and characteristics of the resulting polymer. In the table, reduced viscosity is found from specific viscosity divided by concentration, in meta-cresol at 25° C. and about 0.5 gm. polymer per 100 ml. of solvent; analysis for primary amino groups is by titration expressed as meq./kg. (milliequivalents of primary amino groups per kilogram of polymer); number average molecular weight (abbreviated MW) of the polycarbonamide side chains is calculated from the end group analysis; and melt index is determined by extruding molten polymer at 235° C. through a standard orifice under load of 325 grams (ASTM D1238–62T).

Table 2 below shows the standard tensile properties of the resulting dry and water-soaked graft polymers as measured at 23° C. on the Instron tensile tester at a stretching rate of 0.05 in. per minute per ASTM test D–638–61T and shows the same properties for a standard polycaproamide molding polymer under the heading "Control." Izod impact strength is also shown (ASTM D256–56). Moreover properties obtained by use of particular finely powdered crystallizing agents, viz. BN (boron nitride) and $MgSiO_3$ (talc) are shown in Table 2.

It will be noted per Table 2 that the graft polymer specimens molded at 155° C. show lower water absorption than those molded at 50° C. This is explainable as due to the observed much higher "alpha" crystallinities of the specimens molded at 155° C., viz. about 45%–60% at 155° C. (dry) vs. 0%–30% at 50° C., the higher figures corresponding generally to lower reduced viscosities. At 155° C. molding temperature, these graft polymers show almost solely alpha crystallinity; the standard nylon-6 control shows about 50% total crystallinity but divided about equally between the alpha form and the unstable gamma form. The subject graft polymers correspondingly have better dimensional stability and better resistance to cracking in boiling water than does the nylon-6 control. Crystallinities referred to herein are observed by X-ray spectra.

TABLE 1.—POLYMER PROPERTIES

|  | Ex. 1 | Ex. 2 | Ex. 3 | Ex. 4 | Ex. 5 | Ex. 6 | Control | Ex. 7 |
|---|---|---|---|---|---|---|---|---|
| Charge: |  |  |  |  |  |  |  |  |
| (a) PEI (50% aq.), gm.[1] | 120 | 50 | 80 | 20 | 10 | [2] 60.6 |  | 240 |
| (b) ε-Caprolactam, gm | 700 | 700 | 2,240 | 1,500 | 1,500 | 1,120 |  |  |
| (c) ε-Aminocaproic acid, gm |  | 50 | 160 | 75 | 75 | 80 | Standard | 1,400 |
| (d) Water, ml | 80 | 75 | 200 | 150 | 150 | 100 | Nylon-6 | 100 |
| Reaction temp., °C | 260–280 | 250–270 | 250–260 | 240–260 | 240–280 | 260–270 | molding | 100 |
| Time at temp., hrs | 55 | 30 | 18 | 16 | 19 | 5 | polymer | 225–230 |
| Content (wgt. percent of water-extractables) | 12 | 10 | 10 | 11 | 9 | 13 |  | 15.5 |
| Reduced viscosity, dl./gm | 0.40 | 0.61 | 0.89 | 1.20 | 1.74 | 1.04 | 1.83 |  |
| End groups, meq./kg.: |  |  |  |  |  |  |  | 0.43 |
| (a) $NH_2$ | 1,180 | 620 | 320 | 160 | 90 | 320 | ca. 50 | 1,250 |
| (b) COOH | [3] | [3] | 7 | 12 | 24 | 12 | ca. 50 | 6 |
| Calc. MW of side chains | 850 | 1,600 | 3,100 | 7,750 | 15,200 | 3,100 | ca. 20,000 | 800 |
| Melt index, gm./min | ca. 860/10 | 50/10 | 6.6/10 | 1.0/10 | 32/10 | 1.9/10 | [4] |  |
| Water absorption, percent (soaked 5 days in 50° C. water): |  |  |  |  |  |  |  |  |
| (a) Specimen molded at 50° C | 11.5 | 9.9 | 9.4 |  |  |  |  | 16.5 |
| (b) Specimen molded at 155° C | 10.1 | 8.8 | 8.4 |  |  |  |  | 14.4 |

[1] Polyethylenimine of average molecular weight in the range 30,000–40,000, a 50% by weight solution in water.
[2] Polyethylenimine of average molecular weight in the range 50,000–100,000, a 33% by weight solution in water.
[3] Not detected.
[4] Too high to measure.

TABLE 2.—INSTRON TESTING AT 0.05 INCH/MIN. AND 23° C.

| | 2% Secant Modulus (p.s.i.) | Yield point (p.s.i., 1% offset) | Yield elongation (1% offset) | Yield point (p.s.i., 2% offset) | Ultimate Tensile Strength (p.s.i.) | Ultimate Elongation (at break) | Tensile Impact (Izod, ft.-lb./in.) |
|---|---|---|---|---|---|---|---|
| Ex. 2— | | | | | | | |
| 50° C. mold temp.: | | | | | | | |
| Dry | 83,310 | 7,500 | 9.9% | 7,500 | Broke at yield point | | 2.86 |
| Wet | Too brittle to test | | | | | | |
| Plus 1% BN | 107,000 | 5,560 | 2.8% | 5,560 | Broke at yield point | | |
| 155° C. mold temp.: | | | | | | | |
| Dry | 100,800 | 7,550 | 8.0% | 7,550 | Broke at yield point | | 4.84 |
| Wet | 30,480 | 2,680 | 17.9% | | Broke at yield point | | 176 |
| Plus 1% BN | 109,000 | 5,360 | 1.9% | 5,360 | Broke at yield point | | |
| Ex. 3— | | | | | | | |
| 50° C. mold temp.: | | | | | | | |
| Dry | 91,740 | 11,020 | 14.3% | 8,430 | 7,740 | 80% | 4.80 |
| Wet | 26,490 | 3,660 | 51.8% | | 5,310 | 230% | 348 |
| Plus 1% BN | 110,000 | 10,500 | 4.3% | 10,500 | Broke at yield point | | |
| 155° C. mold temp.: | | | | | | | |
| Dry | 115,480 | 10,650 | 12.6% | 10,380 | 9,330 | 12.9% | 7.15 |
| Wet | 36,330 | 4,780 | 64.9% | | 5,230 | 200% | 286 |
| Plus 1% BN | 121,250 | 8,980 | 3.1% | 8,980 | Broke at yield point | | |
| Ex. 4— | | | | | | | |
| 50° C. mold temp.: | | | | | | | |
| Dry | 116,710 | 9,590 | 11.5% | 8,960 | 8,250 | 210% | 46 |
| Wet | 23,510 | 3,320 | 47.2% | | 9,160 | 350% | 487 |
| Plus 1% Mg SiO₃ | 114,890 | 9,890 | 11.1% | 9,630 | 8,320 | 170% | |
| 155° C. mold temp.: | | | | | | | |
| Dry | 125,560 | 10,030 | 10.9% | 9,860 | 10,070 | 100% | 24 |
| Wet | 24,810 | 4,380 | 77.7% | | 7,880 | 310% | 662 |
| Plus 1% MgSiO₃ | 133,880 | 11,450 | 11.7% | 11,080 | 9,490 | 60% | |
| Ex. 5— | | | | | | | |
| 50° C. mold temp.: | | | | | | | |
| Dry | 100,470 | 9,190 | 12.2% | | 10,860 | 320% | 54 |
| Wet | 22,830 | 3,200 | 46.2% | | 8,000 | 330% | 435 |
| Plus 1% MgSiO₃ | 116,200 | 9,940 | 10.5% | 9,850 | 8,050 | 70% | |
| Plus 1% BN | 108,440 | 10,590 | 11.8% | 10,590 | 8,420 | 175% | |
| 155° C. mold temp.: | | | | | | | |
| Dry | 112,000 | 9,520 | 11.5% | | 9,900 | 260% | 20 |
| Wet | 25,900 | 4,280 | 87.7% | | 8,530 | 330% | 532 |
| Plus 1% MgSiO₃ | 136,790 | 11,310 | 10.9% | 11,040 | 10,790 | 30% | |
| Plus 1% BN | 124,980 | 12,320 | 12.6% | 11,950 | 11,520 | 30% | |
| Control— | | | | | | | |
| 50° C. mold temp.: | | | | | | | |
| Dry | 102,290 | 8,930 | 10.7% | 8,890 | 10,380 | 270% | |
| Wet | 17,150 | 3,190 | 43.1% | | 8,370 | 325% | |
| Plus 1% MgSiO₃ | 123,780 | 10,430 | 10.6% | 10,280 | 8,740 | 320% | |
| 155° C. mold temp.: | | | | | | | |
| Dry | 117,950 | 9,580 | 10.7% | 9,370 | 10,350 | 240% | |
| Wet | 16,000 | 4,060 | 77.7% | | 9,770 | 370% | |
| Plus 1% MgSiO₃ | 140,520 | 11,650 | 10.8% | 11,370 | 9,030 | 60% | |
| Ex. 7— | | | | | | | |
| 50° C. mold temp.: | | | | | | | |
| Dry | 72,650 | 2,250 | 3.4% | | Broke at yield point | | 1.03 |
| Wet | No strength when wet | | | | | | |
| 155° C. mold temp.: | | | | | | | |
| Dry | 72,640 | 1,720 | 2.5% | | Broke at yield point | | 3.29 |
| Wet | No strength when wet | | | | | | |
| Control plus 10% of product of Ex. 7: | | | | | | | |
| Dry, 50° C. mold temp | 107,740 | 9,330 | 11.2% | 9,180 | 8,370 | 320% | |
| Dry, 155° C. mold temp | 123,280 | 10,300 | 11.6% | 9,670 | 9,180 | 120% | |

TABLE 3.—INSTRON TESTING OF DRAWN MONOFILAMENTS (BONE DRY)

| | Heated Plate Temp. for Drawing. °C. | Draw Ratio | Denier of Drawn Monofil | Tensile Modulus (gm./denier at 23 °C.) | Ultimate Tensile Strength (gm./denier at 23 °C.) | Ultimate Elongation (at 230° C.) | Dyeability (percent of dyestuff taken from the bath at max. take-up) |
|---|---|---|---|---|---|---|---|
| Ex. 3 (Could not be spun) | | | | | | | |
| Ex. 4: | | | | | | | |
| (a) | 150 | 6.5 | 420 | 74 | 7.5 | 12.0% | (A) 28%. (B) 93%. |
| (b) | 190 | 7.75 | ca. 400 | 84 | 5.7 | 8.1% | |
| Ex. 5 | 190 | 5.4 | 403 | 79 | 8.0 | 11.4% | (A) 10%. (B) 91%. |
| Ex. 6 | 190 | 5.6 | *100 | 93 | 4.1 | 6.7% | |
| Control: | | | | | | | |
| Standard Nylon-6 Extrusion Grade | 180 | 5.4 | 423 | 85 | 7.6 | 13.6% | (A) 6%. (B) 88%. |
| Standard Nylon-6 molding grade plus 10% of product of Ex. 7 | 190 | 7.2 | | 87.4 | 8.5 | 12.9 | |
| | 190 | 6.0 | | 91.5 | 8.35 | 15.2 | |

(A) Colour Index Disperse Blue 3 (C.I. 61505)
(B) Colour Index Acid Orange 7 (C.I. 15510)
*Small orifice.

In all of the graft polymer products of the above examples, the polyimine backbone contains an average of at least 10 imino nitrogen atoms, and the polycarbonamide side chains, pendant from the backbone, have number average molecular weight of at least 500. Below these minima the molecular weight of the product and/or of the side chains is too low to achieve the desired valuable properties as a plastic material and/or as additive to plastic materials.

Moreover in all of the graft polymer products of the above examples, the polycarbonamide side chains have number average molecular weight not more than ½ the average molecular weight of the backbone chain as determined upon the starting polyimine by the standard methods (such as reduced viscosity measurement). If the side chain molecular weight average is substantially higher than the specified maximum, the product loses the advantages of side chain mobility, in particular the high fluidity and rapid crystallizability at given level of tensile properties, and/or at given proportion of primary amino end groups found in the polymers of this invention. It will be appreciated, accordingly, that the herein described and claimed graft polymers differ fundamentally from reaction products of a short chain polyimine and 1 to 3 mols of caprolactam per mol of the polyimine as disclosed, e.g., in U.S. Patent 2,689,239 of Sept. 14, 1954, to Melamed.

We claim:
1. A polyimine/polycarbonamide graft polymer having as the backbone a polyimine polymer wherein the imino nitrogen atoms are separated on the average by no more than 5 carbon atoms, having polycarbonamide side chains pendant from such nitrogen atoms, said side chains having as repeating unit a carbonamido diradical of a monoaminomonocarboxylic acid with a chain of 3 to 18 atoms between the amido and the carbonyl groups, said side chains having a number average molecular weight of at least 500 and not greater than about ½ the average molecular weight of the backbone chain as determined upon the starting polyimine polymer, the concentration of hydrogen bearing nitrogen atoms in the initial reaction mixture being from about 0.1 to about 25 moles per 100 mols of lactam in the initial reaction mixture.

2. A product of claim 1 wherein the amido group and the carbonyl group of the repeating unit of the side chains are separated by 5 to 11 methylene groups; and the reduced viscosity of the product measured at 25° C. in metacresol solvent at concentration of 0.5 gram of polymer per deciliter of solvent is at least 0.1 dl./gm. and the melt index of the product measured at 235° C. and 325 grams load is at least 0.5 gram per 10 minutes.

3. Product of claim 2 wherein the backbone is composed of polyethylenimine and side chains are composed of poly-e-caproamide which has number average molecular weight in the range 2,000–20,000.

4. Product of claim 3 having reduced viscosity of at least 0.85 dl./gm. and melt index of at least 1 gram per 10 minutes, and at least 90 milliequivalents of primary amino groups per kilogram of the polymer product.

5. Product of claim 3 in the form of a drawn, molecularly oriented filament.

6. Process for production of a polyimine/polylactam graft polymer which comprises forming a polymerization reaction mixture consisting essentially of a lactam, an acidic catalyst, and a polyimine having an average of at least 10 hydrogen-bearing imino nitrogen atoms in each polymer chain and wherein the imino nitrogen atoms of the polyimine are separated on the average by not more than 5 carbon atoms, the concentration of said hydrogen-bearing nitrogen atoms in the initial reaction mixture being from about 0.1 mol to about 25 mols per 100 mols of lactam in the initial reaction mixture.

7. Process of claim 6 wherein said lactam is e-caprolactam, wherein said acidic catalyst is a monoamino monocarboxylic acid having the primary amino group attached to a nonaromatic carbon atom, and wherein said polyimine is polyethylenimine.

8. Process of claim 7 wherein said catalyst is e-aminocaproic acid and the polyethylenimine has average molecular weight of at least 20,000.

9. Process of claim 8 wherein the polyethylenimine has average molecular weight of 50,000–500,000.

10. Product of claim 3 blended with a fiber forming polycarbonamide, in the form of a drawn molecularly oriented filament.

References Cited

UNITED STATES PATENTS 2,689,239  9/1954  Melamed _____ 260—850
3,280,218  10/1966  Endsley.

SAMUEL H. BLECH, *Primary Examiner.*

PAUL LIEBERMAN, *Assistant Examiner.*

U.S. Cl. X.R.

260—2, 37, 45.75, 78